United States Patent [19]

Segan et al.

[11] Patent Number: 5,390,248
[45] Date of Patent: Feb. 14, 1995

[54] APPARATUS FOR DETERMINING TONAL CHARACTERISTICS OF AN OBJECT AND METHOD THEREOF

[75] Inventors: Marc H. Segan, New York, N.Y.; Michael Newsome, Franklin Park, N.J.

[73] Assignee: M.H. Segan & Company, Great Barrington, Mass.

[21] Appl. No.: 6,074

[22] Filed: Jan. 15, 1993

[51] Int. Cl.[6] .............................................. H04R 29/00
[52] U.S. Cl. ........................................ 381/56; 84/454; 351/58
[58] Field of Search ...................... 84/454; 381/56, 58, 381/118

[56] References Cited

U.S. PATENT DOCUMENTS

| | | | |
|---|---|---|---|
| 4,120,229 | 10/1978 | Ota | 84/454 |
| 4,122,751 | 10/1978 | Calvin | 84/454 |
| 4,312,044 | 1/1982 | Baba | 84/454 |
| 5,070,754 | 12/1991 | Adamson | 84/454 |

Primary Examiner—Forester W. Isen
Attorney, Agent, or Firm—Cohen, Pontani, Lieberman, Pavane

[57] ABSTRACT

An apparatus is provided for evaluating the tonal characteristics of an object with respect to a nominal tone which comprises a striker for causing the object to generate an audio signal and a microphone for inputting the audio signal. A reference signal generator generates plural reference signals in accordance with the nominal tone, and those signals are mixed with the audio signal by a mixing circuit. The accuracy of the audio signal with respect to the nominal tone is evaluated in accordance with the audio signal mixed by the mixing circuit.

33 Claims, 18 Drawing Sheets

TYPICAL TONE

BELL

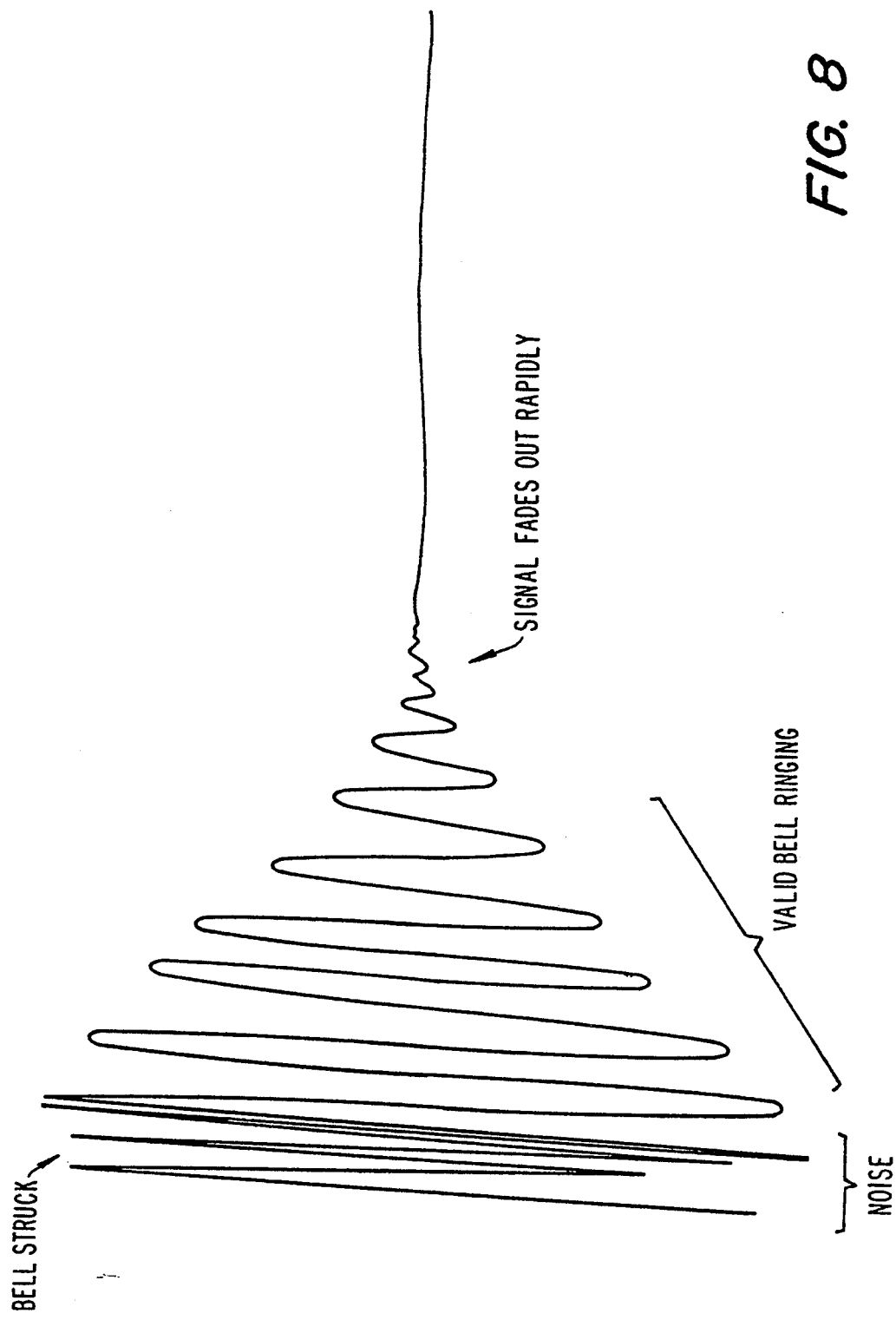

APPARATUS FOR DETERMINING TONAL CHARACTERISTICS OF AN OBJECT AND METHOD THEREOF

FIELD OF THE INVENTION

This invention relates to an apparatus for determining tonal characteristics of an object, and more particularly to an apparatus for determining the tonal characteristics of musical bells used in a Christmas display. The invention also relates to the method of conducting such determination.

BACKGROUND OF THE INVENTION

In commonly-assigned application Ser. No. 07/771,346, filed Oct. 4, 1991, a musical display such as a Christmas display is provided comprising a plurality of ornaments. Each of the plurality of ornaments includes a pair of bells, wherein each bell is capable of playing a distinctive note or tone. Each ornament also includes a striker for striking, one at a time, a selected one of the pair of bells. An electronic controller is provided for generating electrical sights to each ornament to strike each bell in coordination and, thus, playing a musical tune.

Such a Christmas display is fabricated from bells which are mass-produced and are low-cost. These low-cost bells typically deviate from their respective nominal or ideal tones by, for example, up to five percent. However, in such an apparatus, in order to produce a pleasing musical tune, all of the bells must be in tune, that is, each bell must accurately emit its respective nominal note. Otherwise, if such a Christmas display comprises bells which have tonal characteristics that deviate from their respective nominal tones, the musical Christmas display will sound "off-key" or out of tune and not very pleasing to the listener.

To avoid the above-discussed disadvantages, manufacturing techniques include the use of suitable testing equipment known in the art, such as digital frequency meters, oscilloscopes, etc., to measure the note or, more specifically, the frequency characteristic of each bell. If the tested bell has a frequency characteristic within a predetermined tolerance of its nominal frequency, the bell is used; otherwise, the bell is discarded.

This manufacturing technique has several disadvantages. First, the testing equipment is rather complex, costly, and time-consuming to use. And due to its complexity, operators of such equipment must have a higher skill than is generally required for the manufacture of such Christmas ornaments. Therefore this technique does not lend itself well to low cost mass-produced products. Second, such test equipment typically indicates the absolute tonal characteristic. That is, the test equipment will display the fundamental frequency of the bell. Therefore, the operator must interpret these results to determine whether the bell is acceptable or not. Such interpretations could lead to inconsistent and/or inaccurate determinations, especially for those operators who are not familiar with the test equipment. Moreover, bells having frequencies outside the acceptable tolerance of nominal frequencies are generally discarded. This results in discarding many bells, generally raising manufacturing costs.

The inventors recognize that a reasonable rendition of a musical tune can be produced if the bells used in the display are in tune relative to one another. In other words, if each bell emits a note which is, by way of example, 2% higher than its respective nominal note, the playing of such device will produce a pleasing musical tune or melody, even with bells that would have been discarded by using conventional manufacturing techniques.

Therefore, the inventors propose an inexpensive device which is simple to use and can simply grade the bells with respect to deviation from their respective nominal notes. In such a manufacturing technique, the bells are first graded according to their deviation from their respective nominal notes. The display is then assembled from bells of the various nominal notes having the same grade. Accordingly, with such a technique fewer bells are discarded resulting in a higher utilization rate of the bells. Therefore, manufacturing costs may be reduced.

OBJECTS OF THE INVENTION

It is an object of the invention to obviate the afore-discussed problems.

It is a further object of the invention to provide an apparatus which can select a musical element for use in a musical device in accordance with its relative tonal characteristic.

It is also an object to provide a method for making such selection.

It is still yet another object of the invention to provide an apparatus which can simply grade the tonal characteristic of a musical element.

Other objects and features of the present invention will become apparent from the following detailed description considered in conjunction with the accompanying drawings. It is to be understood, however, that the specification and drawings are designed solely for the purposes of illustration and not as a definition of the limits of the invention, for which reference should be made to the appended claims.

SUMMARY OF THE INVENTION

According to one aspect of the present invention, an apparatus for evaluating the tonal characteristics of an object with respect to a nominal tone is provided with a means for causing the object to generate an audio signal. An input means inputs the audio signal, and a reference signal generating means generates a plurality of reference signals having a predetermined frequency relationship with the nominal tone. A mixing means mixes the audio signal input by the input means with each of the reference signals, and an evaluating means evaluates the frequency of the audio signal relative to the nominal tone in accordance with the audio signal mixed by the mixing means.

In accordance with another aspect of the present invention, an apparatus is provided for evaluating the tonal characteristics of an input signal with respect to a nominal tone comprising an input means for inputting the input signal. A reference signal generating means generates a plurality of reference signals having a predetermined frequency relationship with the nominal tone signal, and a mixing means mixes the input signal with each of the plurality of reference signals. An evaluating means evaluates the accuracy of the input signal with respect to the nominal tone in accordance with the audio signal mixed by the mixing means.

In accordance with a further aspect of the present invention, an apparatus is provided for evaluating the tonal characteristics of a musical bell with respect to a nominal tone comprising a first means for causing the musical bell to generate an audio signal. A reference signal generating means generates a first reference signal having a first frequency representing the nominal tone, a second reference signal having a second reference frequency greater than the nominal tone and a third reference signal having a third frequency less than the nominal tone. A mixing means mixes the audio signal with the first, second and third reference signals and provides first, second and third output signals. An evaluating means evaluates the accuracy of the audio signal with respect to the nominal tone in accordance with the first, second and third output signals from the mixing means. An output means outputs to a display, for example, a plurality of lights, the evaluation of the audio signal from the evaluating means.

According to still yet another aspect of the present invention, a method of manufacturing a sound emitting apparatus comprising at least first and second tone generating elements comprises the steps of providing a plurality of first tone generating elements each capable of generating substantially a first nominal tone and providing a plurality of second tone generating elements each capable of generating substantially a second nominal tone. Each of the plurality of first tone generating elements are graded in accordance with a deviation from the first nominal tone into at least one of a first grade of the first nominal tone and a second grade of the first nominal tone. Each of the plurality of second tone generating elements is graded in accordance with the deviation from the second nominal tone into at least one of a first grade of the second nominal tone and a second grade of the second nominal tone. The sound emitting apparatus is assembled by selecting either a first tone generating element having the first grade and a second tone generating element having the first grade or a first tone generating element having the second grade and a second tone generating element having the second grade.

DETAILED DESCRIPTION OF THE DRAWINGS

In the drawings, wherein like numerals represent like parts:

FIG. 8 is a waveform at output D of operational amplifier U8A of FIG. 4;

DETAILED DESCRIPTION OF THE PRESENTLY PREFERRED EMBODIMENTS

Figure 1:
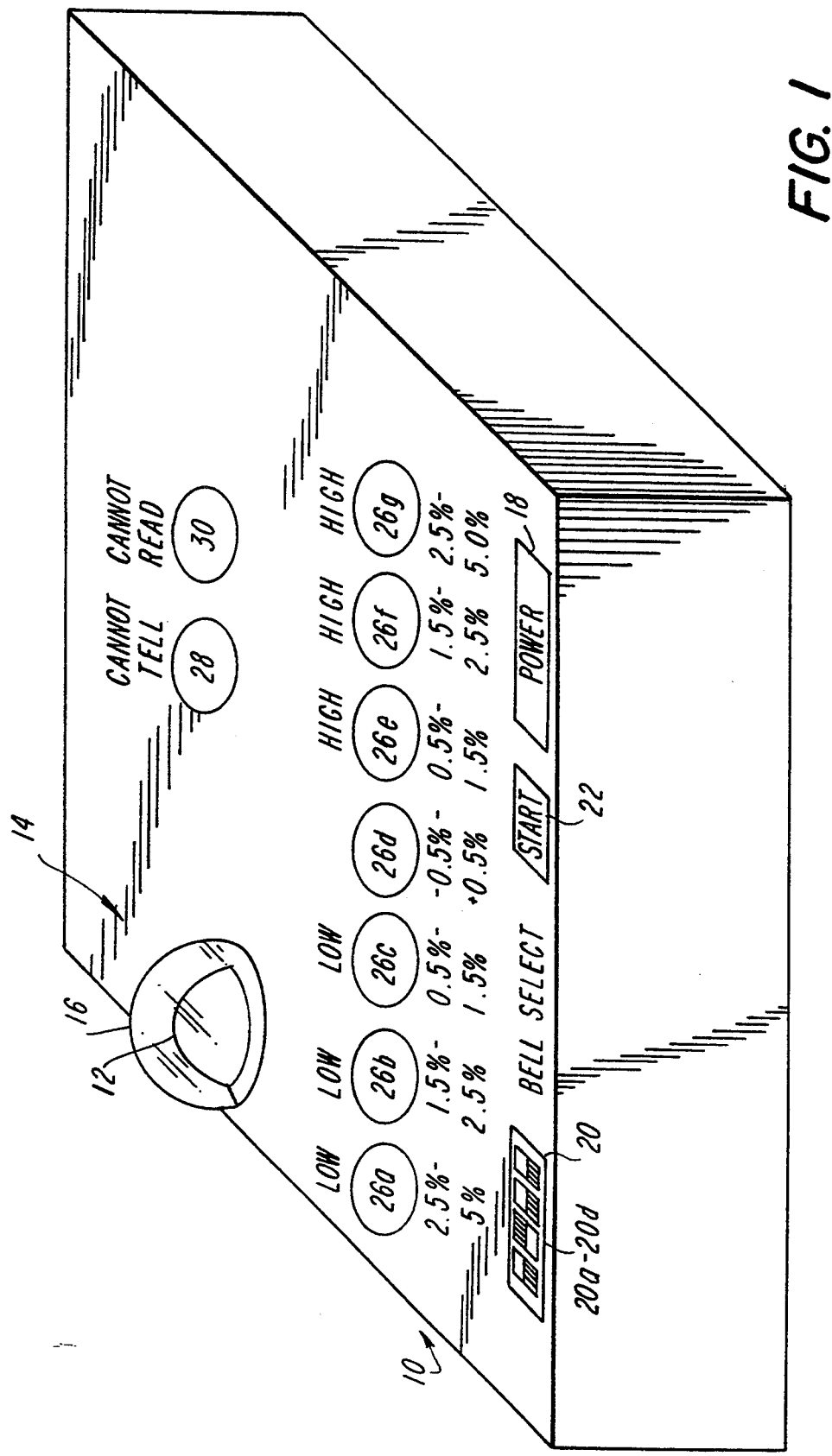
FIG. 1 is a perspective view of a bell tester in accordance with the invention.
Figure 2:
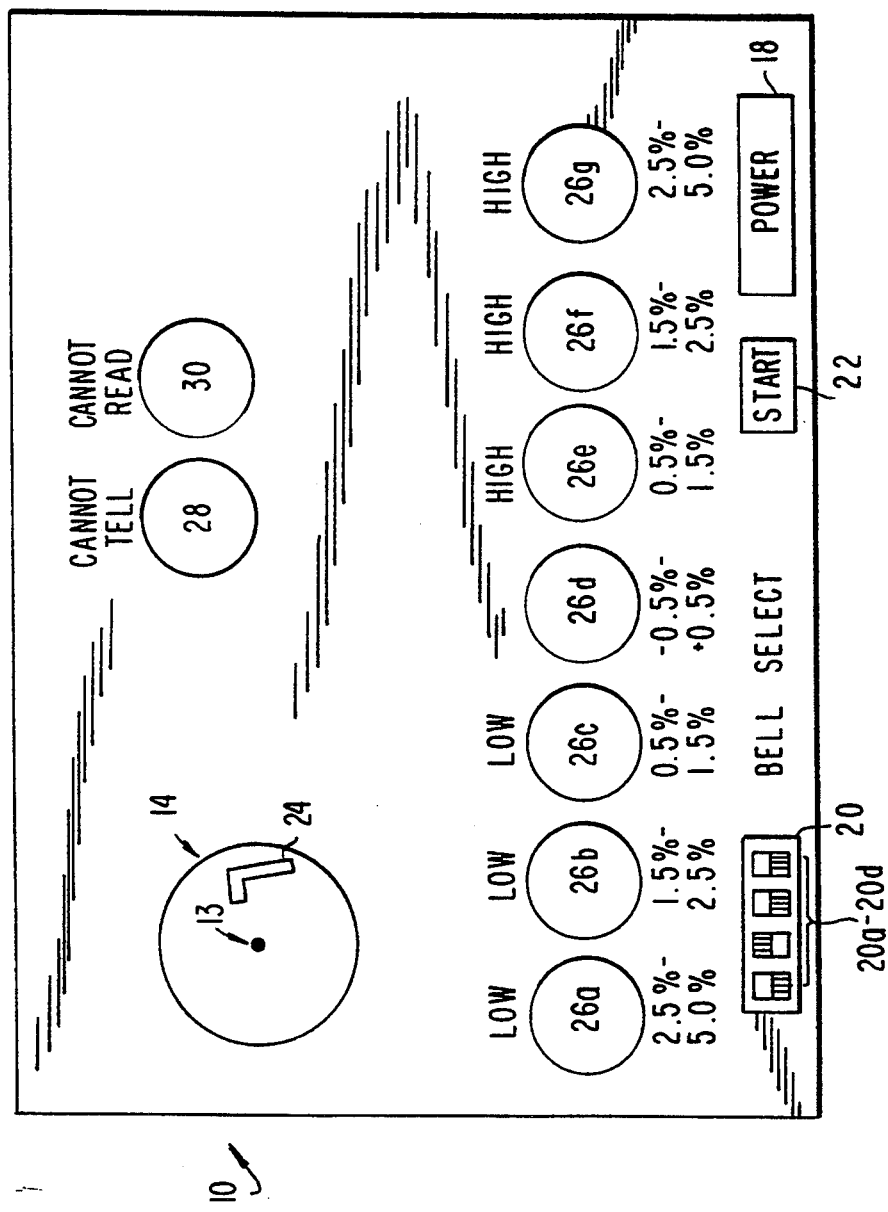
FIG. 2 is a top view of the bell tester in accordance with the invention.

Turning now to the drawings, FIGS. 1 and 2 depict a bell tester 10 for grading a bell 12 in accordance with the present invention. A spindle 13 or the like is provided to secure the bell 12 in enclosure 14. A removable cover 16 is provided to isolate the bell disposed in the enclosure 14 from ambient noise. The cover 16 may be made of plastic, glass, or any sound insulating material, and is typically hemispherically-shaped. A power switch 18 is provided for turning on and off the bell tester 10. The type of bell, i.e. the note of the bell, is selected with a bell select switch 20. Bell select switch 20 comprises, for example, four ON/OFF switches 20A–20D for selecting one of the various types of bells to be tested. That is, by setting switches 20A–20D, the specific type of bell i.e. the note, is selected. A start switch 22 is provided for initiating the testing procedure by causing striker 24 to strike bell 12 to thereby emit a sound.

In this preferred embodiment, since there are four switches, each having one of two states, that is, either on or off, there is a maximum number of $2^4$, or 16, types of bells which can be tested.

As will be readily apparent, the number of selection switches is a function of the maximum number of bell types to be tested. That function is defined as $2^n = X$, where n is the number of switches and X is the maximum number of bell types to be tested. While the preferred embodiment comprises four ON/OFF switches, it is contemplated that any appropriate number of ON/OFF switches may be utilized.

The bell tester 12 is provided with lights 26A–26G to indicate the tested grade of the bell, though any suitable means for outputting the grade information may be used. For example, if light 26D is illuminated, the tested bell is within ±0.5% of its nominal frequency. Table 1 indicates the grading of the bell for seven different grades, though as will be apparent to those of ordinary skill in the art who have read this description, more or less grades may be employed.

TABLE 1

| Lamp Illuminated | Grade (% below/above nominal tone) |
| --- | --- |
| 26A | −2.5 to −5.0 |
| 26B | −1.5 to −2.5 |
| 26C | −0.5 to −1.5 |
| 26D | −0.5 to +0.5 |
| 26E | +0.5 to +1.5 |
| 26F | +1.5 to +2.5 |
| 26G | +2.5 to +5.0 |

Lamp 28 is provided for indicating that the tested bell does not correspond to any particular grade, and lamp 30 is provided for indicating that there is insufficient test data for grading the tested bell.

Figure 3:
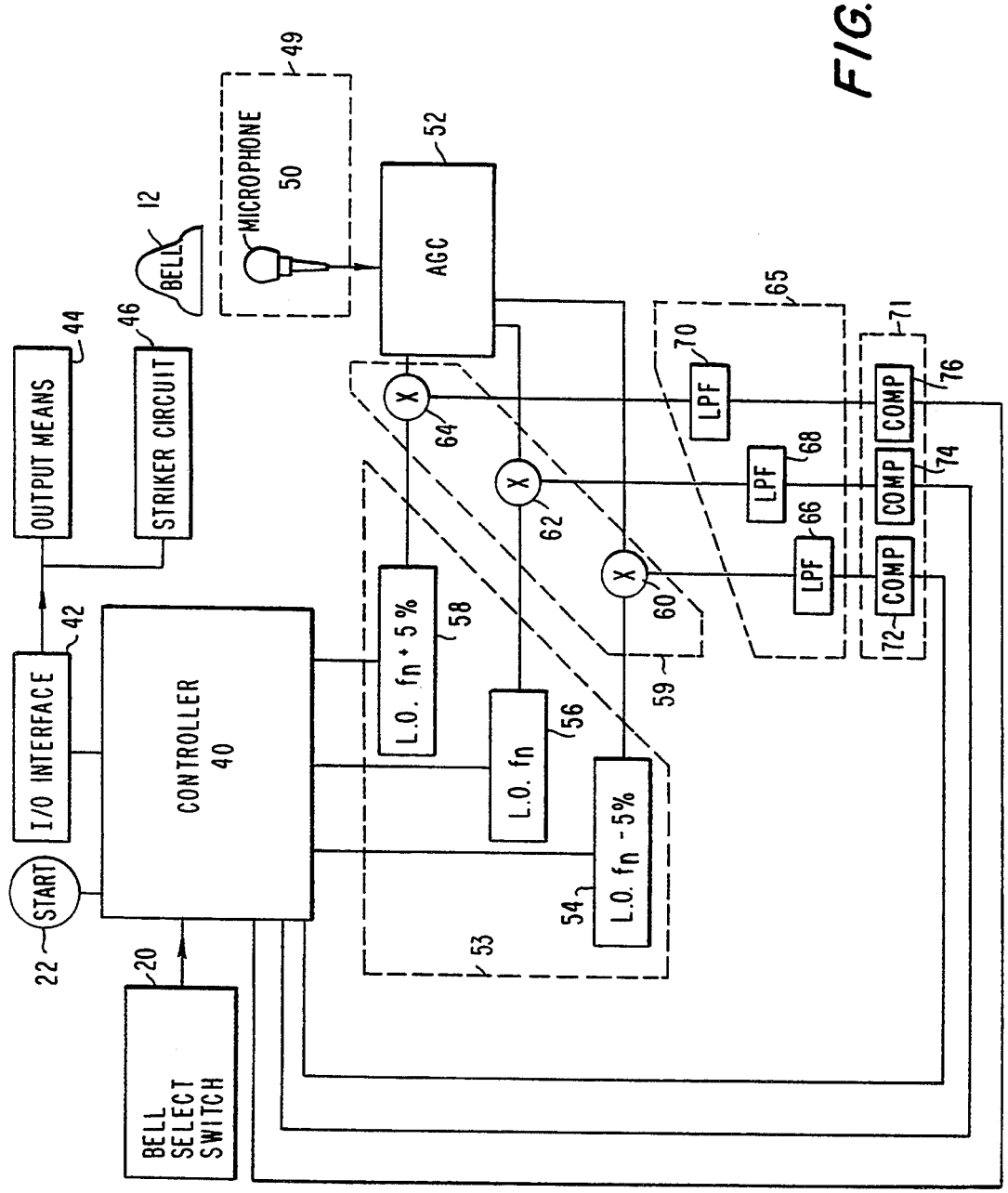
FIG. 3 is a block diagram of the circuit for the bell tester of FIG. 1.

FIG. 3 shows, in block diagram form, the circuitry incorporated in the bell tester 10 for testing the bell 12 and indicating its grade by lights 26A-26G. As diagrammatically illustrated in FIG. 3, and in accordance with the preferred embodiment of the invention, outputs from the bell select switches 20A-D, i.e. the type of bell being tested, and the start switch 22 are input to a controller 40.

Controller 40, which preferably comprises a microprocessor, provides one group of outputs to interface circuit 42 for providing signals of appropriate levels to output means 44. Output means 44 comprises any suitable means for indicating the grading of bell 12, such as lights 26A-26G, 28, and 30, which may be incandescent lamps or LEDs. Alternatively, the output means may be an audio device or a computer display terminal. Alternatively, and as will be apparent to one of ordinary skill in the art who has read this description, the bell tester could provide the grading of bell 12 directly to a robotic system for assembling the Christmas display.

The interface 42 also provides a signal of an appropriate level to motor 46. A striker 24 is mechanically secured to the rotor of motor 46, such that when a signal is provided by interface circuit 42, the striker 24 strikes the bell 12 to excite it, thereby generating a sound. In the preferred embodiment, the striker 24 is the same striker used in the Christmas display, so the bell will emit substantially the same sound as in the display. The sound emitted by the bell 12 is input to the bell tester 12 by, for example, a conventional microphone 50. The output of microphone 50 is processed by an automatic gain control circuit 52 to amplify the maximums and minimums of the signal to a substantially constant amplitude in a manner well known in the art. Controller 40 includes a look-up table (not shown) for storing for each bell type its corresponding frequency set points. In the preferred embodiment the frequency set points are the nominal frequency of the bell for the selected bell type, the nominal frequency of the bell less 5% and the nominal frequency of the bell plus 5%. Controller 40 downloads the frequency set points of the bell selected by switches 20A-D in accordance with the look-up table to local oscillator means 53. Local oscillator means 53 comprises local oscillators 54, 56, and 58 which are known in the art and generate square waves having frequencies 5% below the nominal frequency of the selected bell type, the nominal frequency of the selected bell type, and 5% above the nominal frequency of the selected bell type, respectively.

The outputs of local oscillators 54, 56, and 58 are mixed by mixer means 59 comprising mixers 60, 62, and 64, respectively, with the output of automatic gain circuit 52 in a known manner to provide three modulated output signals. The modulated output signals of mixers 60, 62, and 64 are filtered by low pass filter means 65 comprising low-pass filters 66, 68, and 70, respectively. The cutoff frequency for low-pass filters 66, 68, and 70 is, by way of example, 100 Hz. Thus, low-pass filters 66, 68 and 70 filter out unwanted high frequency and "noise" components from the three modulated signals.

The outputs of the low-pass filters 66, 68 and 70 are compared to a predetermined level by comparator means 71 comprising comparators 72, 74, and 76, respectively. If any of the outputs of the low-pass filters is greater than the predetermined level, the output of the corresponding comparator is, for example, 5 volts. Alternatively, if any of the outputs is less than the threshold voltage, the corresponding output is, for example, zero volts.

The overall effect of the mixing, filtering and comparing by mixers 60, 62 and 64, low-pass filters 66, 68 and 70 and comparators 72, 74 and 76, respectively, is to generate three output signals on three channels which indicate the extent of frequency deviation of the input signal as derived from microphone 50 from the nominal frequency of the selected bell type. The first output signal on the first channel is the absolute value of the difference between the frequency of the input signal of the tested bell and the nominal frequency of the selected bell type less 5%, the second output signal on the second channel is the absolute value of the difference between the frequency of input signal of the tested bell and the nominal frequency of the selected bell type, and the third output signal on the third channel is the absolute value of the difference between the input signal of the tested bell and the nominal frequency of the selected bell type plus 5%.

Figure 4A:
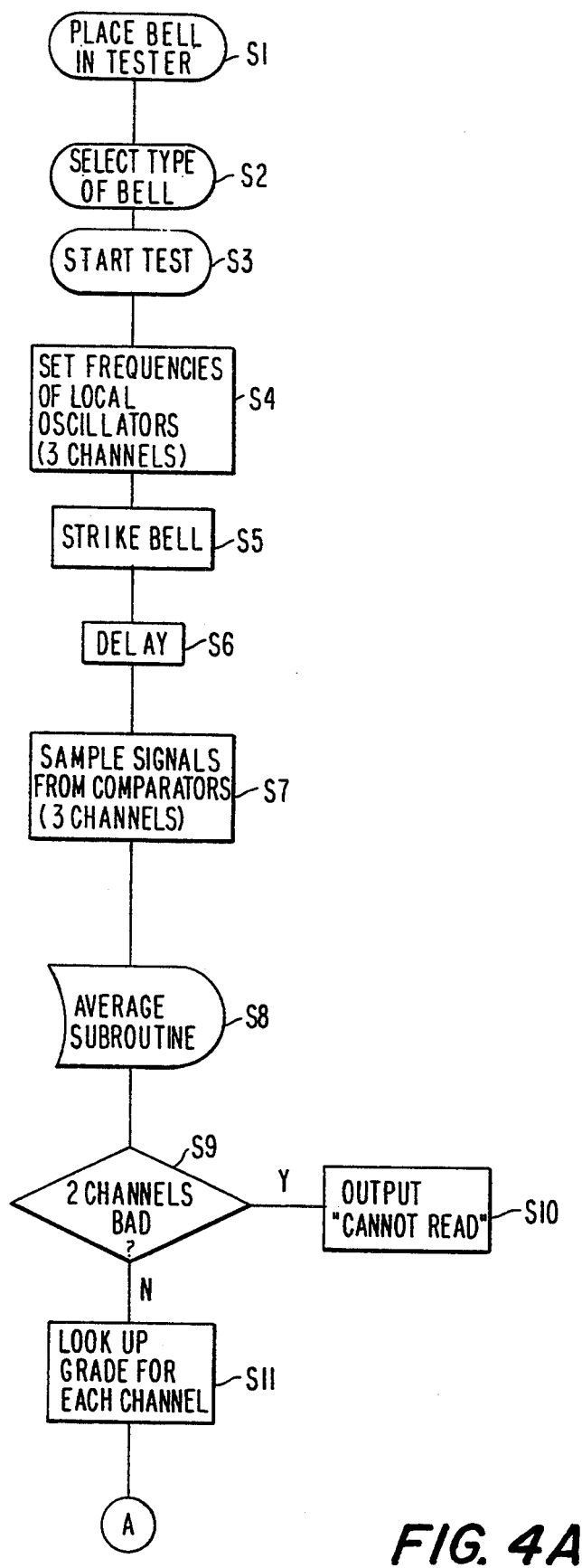
FIGS. 4A and 4B are flow charts for the operation of the bell tester.

The outputs of the comparators 72, 74, and 76 are sampled and stored in controller 40 for evaluation to grade the bell 12. The controller determines the frequency of the signal on each channel to determine the extent of the frequency deviation from the nominal frequency of the selected bell. This determination results in the grading of the bell 12 whereupon one of lights 26A-G, 28 or 30 is illuminated. The algorithms used by controller 40 to grade the bell 12 are illustrated in FIGS. 4A, B and 5A-C and will be discussed hereinbelow.

Figure 7A:
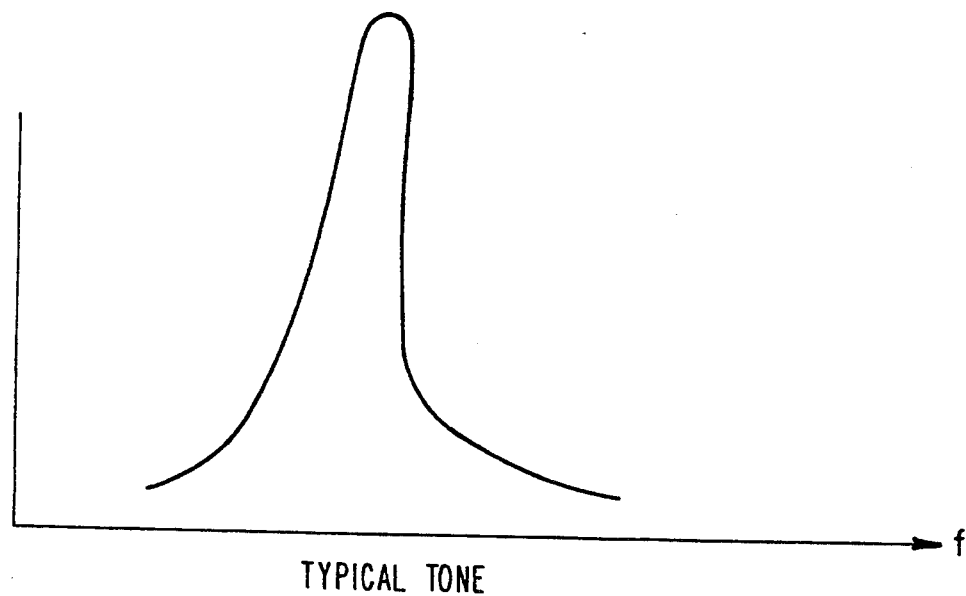
FIG. 7A is an example of a frequency distribution curve of a typical musical tone.
Figure 7B:
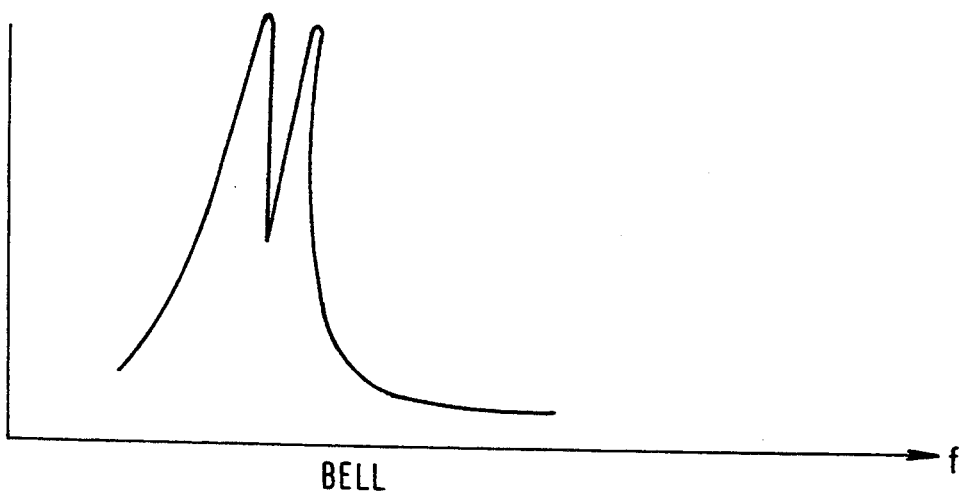
FIG. 7B is an example of a typical frequency distribution curve of a bell.

At this point it is useful to discuss the frequency characteristic of a typical bell as compared to a typical note, as generated, for example, by a piano. A typical note has a frequency response as shown in FIG. 7A which illustrates the frequency as the abscissa and the amplitude as the ordinate. As shown in that figure, the note has a frequency distribution with a rather sharp peak at its fundamental frequency. Referring to FIG. 7B, however, the frequency response of a bell typically has two fundamental frequencies, as indicated by its two peaks. The two peaks shown in FIG. 7B are believed responsible for the apparent modulation of the bell waveform after reaching resonance. The bell tester of the invention averages the outputs of the comparators to compensate those dual peaks, as will be discussed below.

The general operation of the bell tester will now be described with respect to a Christmas display comprising, by way of example, three types of bells having nominal frequencies of 2000 Hz, 2500 Hz and 3000 Hz, respectively. As previously explained, a reasonable rendition of a musical tune can be produced if the bells used in the display are in tune relative to one another. Toward this end, the bells are first sorted by their respective nominal frequencies, i.e. all bells having a nominal frequency of 2000 Hz are stored together, all bells having a nominal frequency of 2500 Hz are stored together, etc. The bells are then preferably tested by bell type as a matter of efficiency.

More specifically, the operator first sets the nominal frequency of the bell type with bell select switch 20. For example, if bells having a nominal frequency of 2000 Hz are to be tested, the operator sets switches 20A-20D to their appropriate positions so as to set the bell tester for bells having a nominal frequency of 2000 Hz. The operator then places a bell to be tested in the enclosure 14 over the spindle 13 and closes the cover 16. The operator initiates the testing sequence by depressing start switch 22 whereupon striker 24 strikes the bell to thereby emit an audible sound which is picked up by microphone 50 and converted to an electrical signal. The electrical signal is then processed and analyzed to determine a grade for the tested bell. Thereafter the bell tester illuminates one of the lights 26A–26G, 28 or 30 to indicate the grade in accordance with Table 1.

For example, if the tested bell has a frequency of 2005 Hz or 0.25% above the nominal frequency of 2000 Hz, the light 26D is illuminated, indicating that the tested bell is within ±0.5% of the nominal frequency. The operator then places that tested bell in a bin (not shown) assigned to bells having a nominal frequency of 2000 Hz/±0.5%. If the bell tested has a frequency of 1940 Hz or 3% below the nominal frequency of 2000 Hz, the light 26A is illuminated indicating that the tested bell is between 2.5% and 5% below its nominal frequency. The operator then places that bell in a different bin, more specifically, a bin for bells which have a frequency between −2.5% and −5.0% of the nominal frequency of 2000 Hz, and so on. If after testing the bell either the light 28 "cannot tell" or the light 30 "cannot read" is illuminated, that tested bell is placed in a separate bin for rejects. As will now be apparent, each tested bell having a nominal frequency of 2000 Hz is placed in one of eight bins, the first seven bins corresponding to the grading shown in Table 1 and the eighth bin for ungradable bells.

In the example given, the operator then proceeds to test all bells having a different nominal frequency, say 2500 Hz, for grading in accordance with Table 1 whereupon these bells are separated into a second set of eight bins in accordance with their respective grades. Finally, bells having a nominal frequency of 3000 Hz are tested and sorted into a third set of eight bins in accordance with their respective grades.

Upon completion of the bell testing, the Christmas displays may be assembled. More specifically, in this example of a Christmas display having three bell types, each Christmas display is assembled with bells having the same grade. That is, Christmas displays may be assembled exclusively with bells having a grade of ±0.5% of their respective nominal frequencies, exclusively with bells having a grade of −2.5% to −5% of their respective nominal frequency, etc.

Accordingly, as described, the bells are easily tested by an operator, who does not require a high degree of technical competency. The bell tester provides a simple output indicating the grade of the bell whereupon the tested bell is placed in a bin in accordance with its tested grade for its nominal frequency. This procedure is performed for every bell for each bell type. Each Christmas display is then assembled with bells having the same grade. By using this procedure the Christmas display can be manufactured quickly without a significant waste of bells.

Figure 4B:
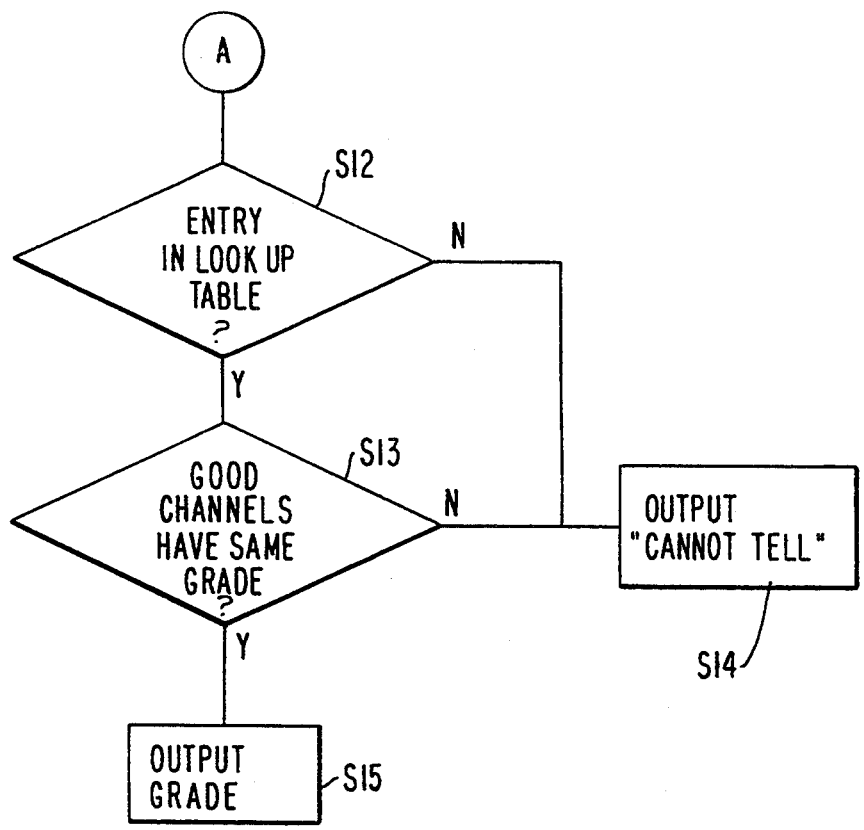

The operation of the bell tester will now be discussed in conjunction with the flow charts of FIGS. 4A and 4B. As noted above, typically the bells are tested by type. That is, all bells having a first nominal frequency are tested at one time, then all bells having a second nominal frequency are tested, etc. This minimizes the number of times the bell select switch 20 must be adjusted.

To test a bell 12 the operator places the bell over spindle 13 and closes cover 16 (step S1). The operator then selects the bell type with the bell select switch 20 (step S2), and then initiates the test by depressing start switch 22 (step S3). When the start switch 22 is depressed, controller 40 provides a signal to start the motor M1 to cause the striker 24 to strike the bell 12 (step S5), thereby exciting the bell 12 to emit a sound.

Microphone 50 converts the audio signal from bell 12 into an input electrical signal, the waveform of which is shown in FIG. 8. As shown in FIG. 8, the signal consists of three portions. The first portion of the signal is considered "noise" which is not to be analyzed; the second portion is a valid decaying ringing signal; and the third portion is the ringing signal which has significantly decayed and is therefore unusable for analysis.

Figure 9A:
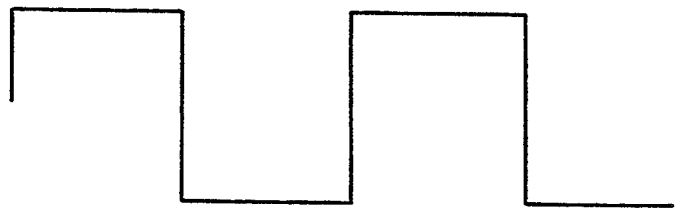
FIGS. 9A–9C are waveform outputs at points A, B, and C, respectively, of the local oscillators of FIG. 4.
Figure 9B:
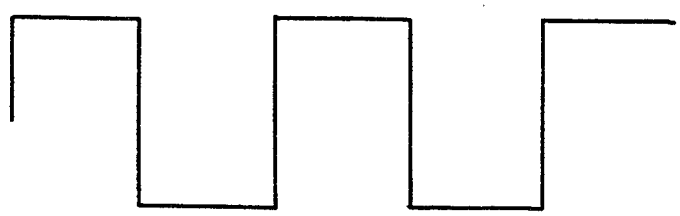
Figure 9C:
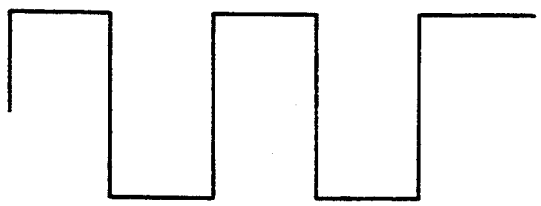
Figure 10:
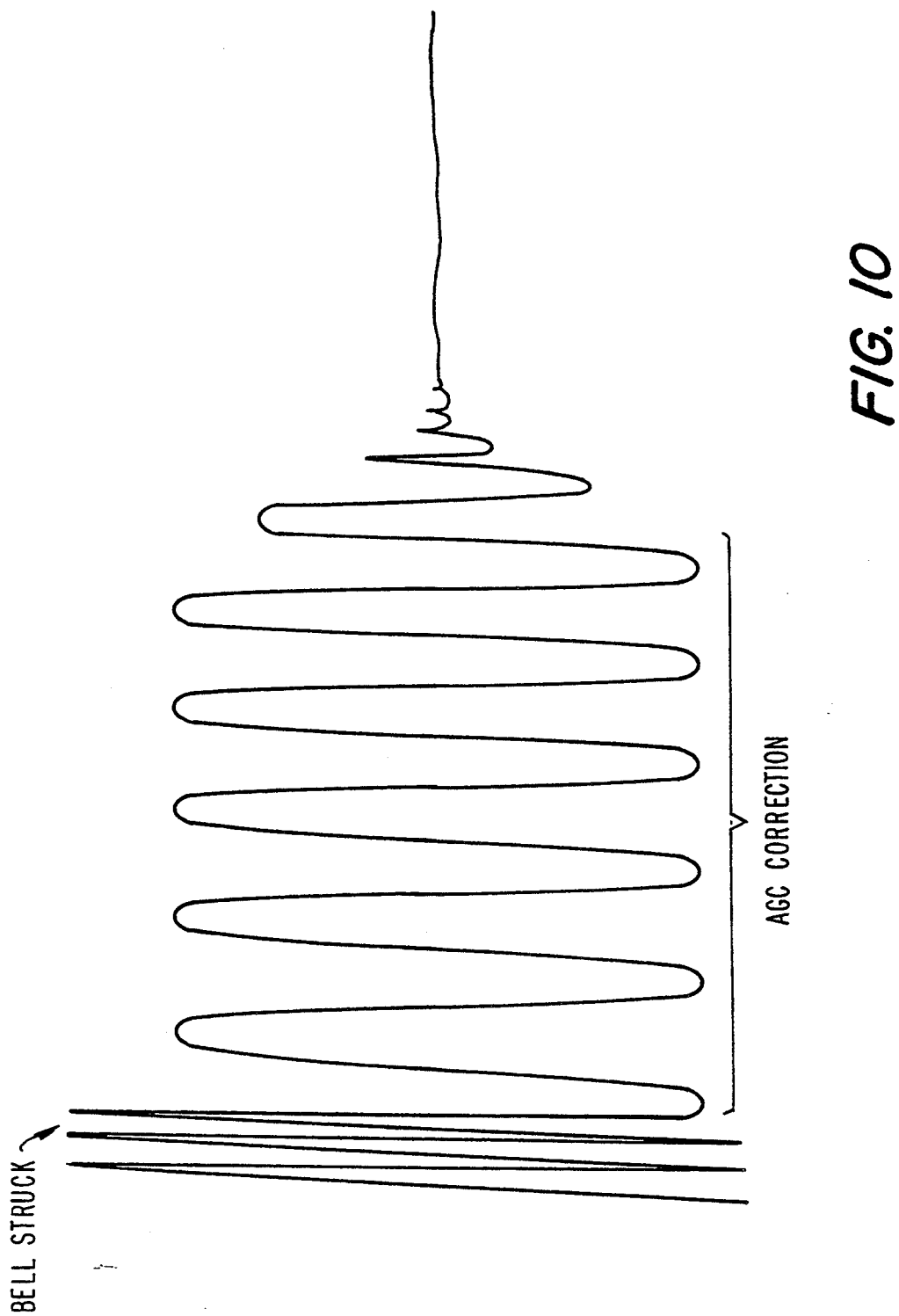
FIG. 10 is a waveform at output E of AGC circuit 52 of FIG. 4.

The output is then processed in a conventional manner by automatic gain circuit 52 which has the output waveform shown in FIG. 10. It is noted that the automatic gain circuit corrects for the decay of the bell signal by amplifying the maximums and minimums of the signal to a substantially constant amplitude without, however, altering the frequency of the signal. The controller 40 provides the three frequency set points for the selected nominal frequency to local oscillator means 53 comprising oscillators 54, 56 and 58 (step S4), i.e. the nominal frequency of the selected bell less 5%, the nominal frequency of the selected bell and the nominal frequency of the selected bell plus 5%. The waveform outputs of the local oscillating means are shown in FIGS. 9A–9C. FIG. 9A illustrates the output of oscillator 54 having a square wave with a frequency of the nominal frequency less 5%, FIG. 9B shows the output of local oscillator 56 having a square wave with a frequency of the nominal frequency, and FIG. 9C shows the output of oscillator 58 having a square wave with the frequency of the nominal frequency plus 5%.

Figure 11:
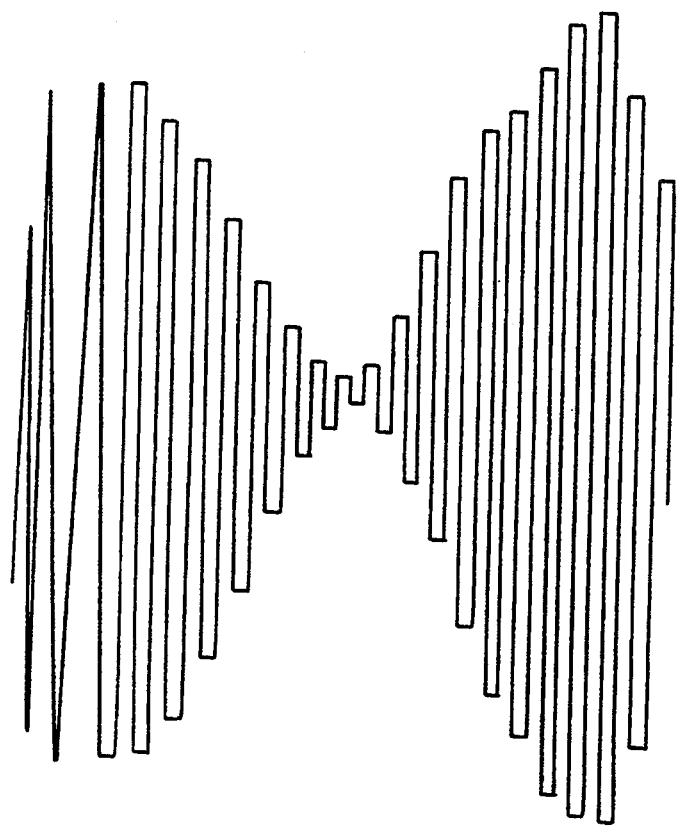
FIG. 11 is a waveform at the output of the mixer circuit at point G of FIG. 4.
Figure 12A:
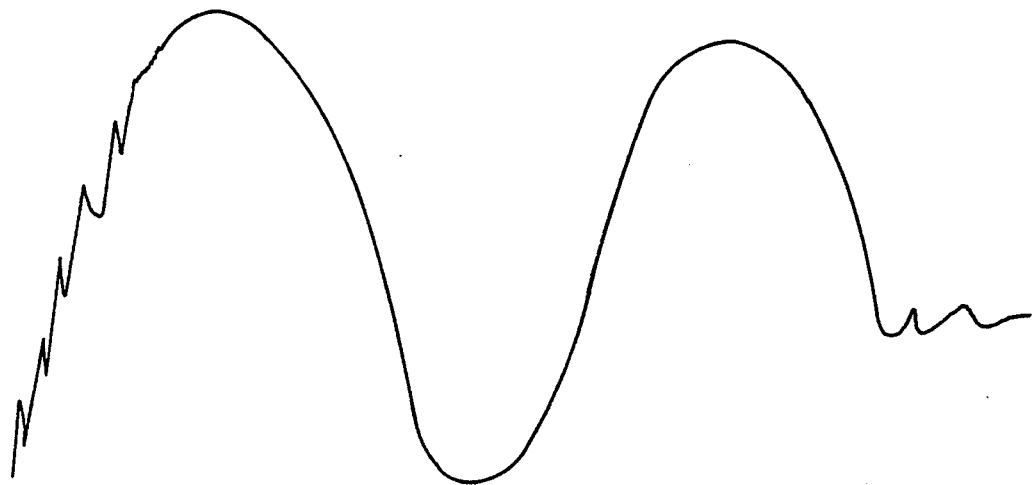
FIGS. 12A–12C are waveforms at the outputs of the low-pass filters at points I, J, and K, respectively, of FIG. 4.
Figure 12B:
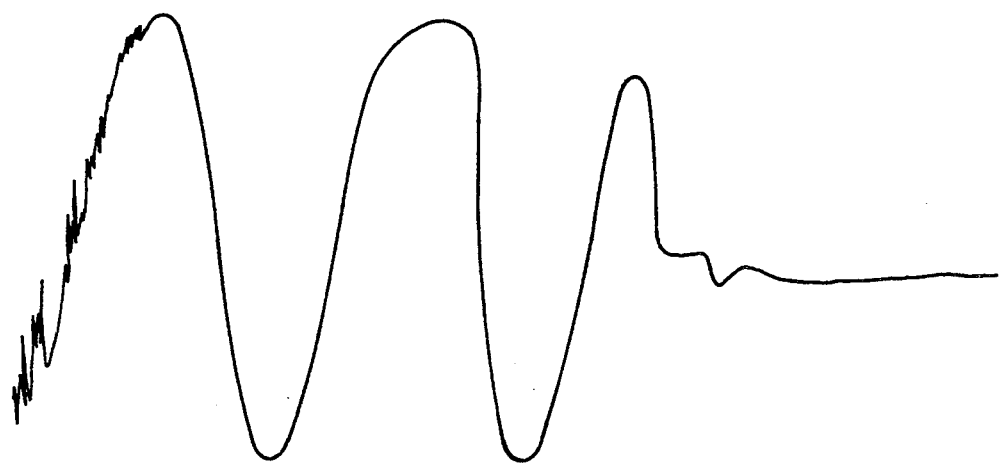
Figure 12C:
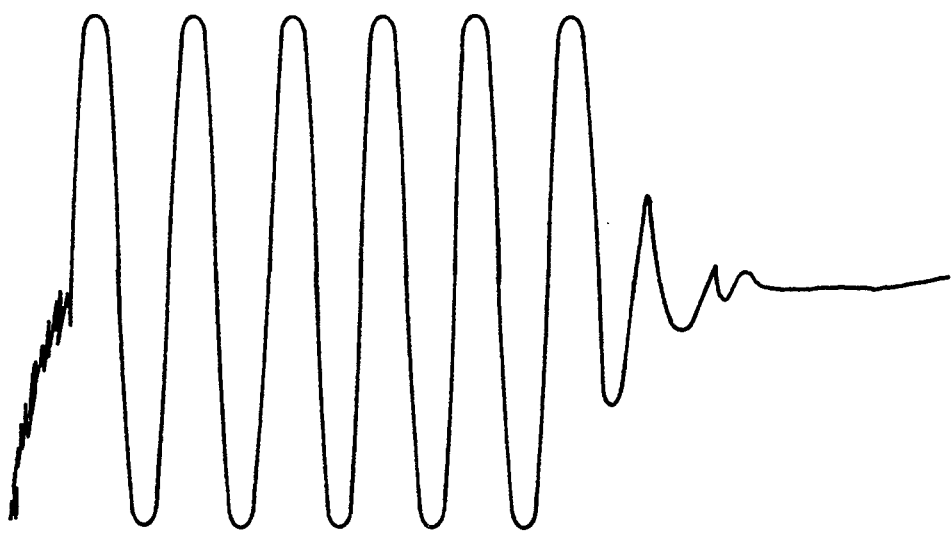
Figure 14:
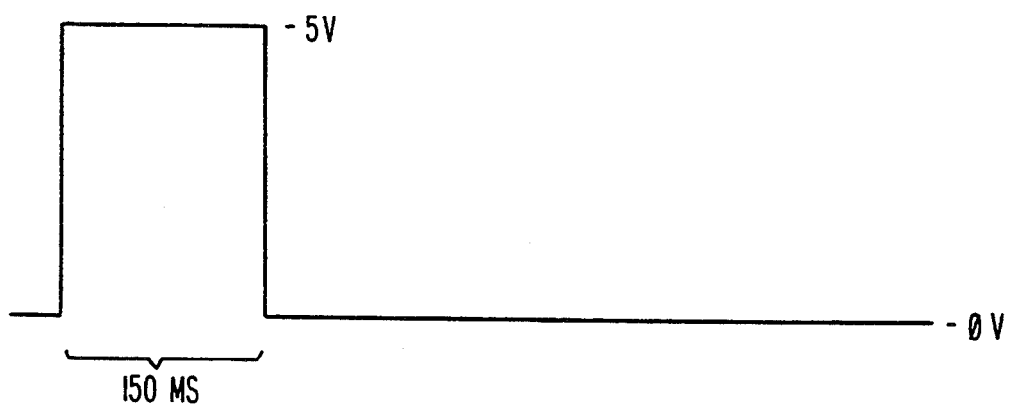
FIG. 14 is the waveform output of microprocessor U2 to initiate the striking of the bell.

The outputs of the three oscillator circuits 54, 56 and 58 are mixed with the input signal from the AGC circuit 52 by mixer circuit 59 to provide three modulated signals. FIG. 11 illustrates one of the modulated signals. The three mixed signals are processed by the low-pass filters 66, 68 and 70 each of which has a cutoff frequency of, for example, 100 Hz. Thus, low-pass filters 66, 68 and 70 filter out any unwanted high frequency and "noise" components from the three modulated signals. The waveform outputs of low-pass filters 66, 68 and 70 are shown in FIGS. 12A–C, respectively.

Figure 13A:
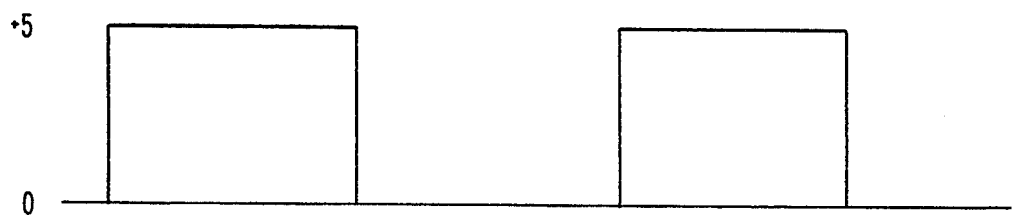
FIGS. 13A–13C are waveforms at the outputs of the comparator circuit 73 at points L, M, and N, respectively, of FIG. 4.
Figure 13B:
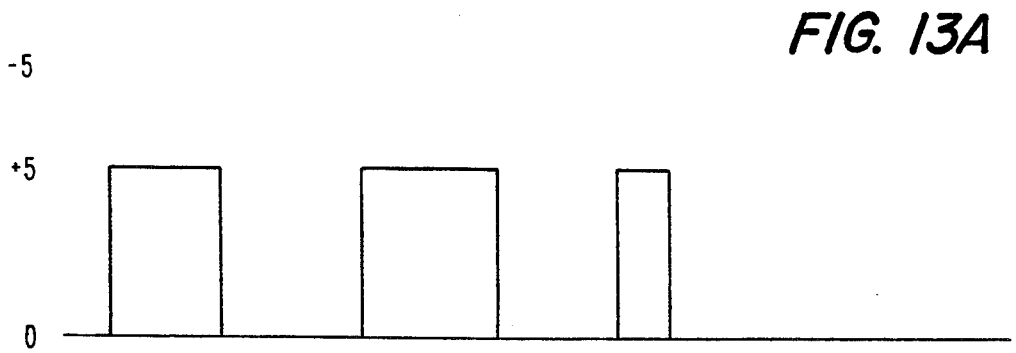
Figure 13C:
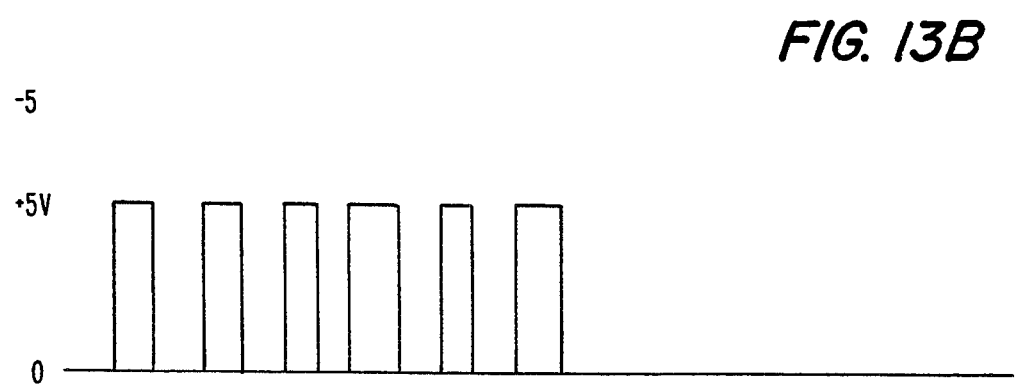

The outputs of the low-pass filters 66, 68 and 70 are input to comparator circuits 72, 74, 76, respectively, which have outputs shown in FIGS. 13A–13C, respectively. These outputs, which appear as nonperiodic square waves having an amplitude of either 0 volts or 5 volts, are input to the controller 40.

The controller 40 delays for a predetermined time to avoid analyzing the noise portion generated by the bell (step S6), as shown in the first part of the waveform of FIG. 8. The predetermined delay time is a function of the type of bell tested. Toward this end, the look-up table also comprises a table storing a bell-type and a corresponding predetermined delay time. For example, a low frequency bell has a typical predetermined delay time in the range of 20–40 milliseconds, while a high frequency bell has a predetermined delay time in the range of 100–200 milliseconds. In step S7, controller 40 samples the three output channels from the three comparators 72, 74 and 76, respectively. The controller 40 calculates the average period for each of the channels in the average subroutine (step S8). The controller 40 calculates the average to account for the double fundamental frequency as shown in FIG. 7B and to provide a more accurate analysis. If the average subroutine (step S8) determines that two channels are "bad" (step S9), the controller 40 provides a signal to illuminate light 30 indicating that the bell tester cannot make a frequency determination (step S10). The look-up table in controller 40 also comprises another table containing, for each type of bell, the average for each channel and its corresponding grade. If the average subroutine indicates at least two "good" channels, the controller 40 compares the averages for each channel with those stored in the look-up table (step S7). The details of the determination of "good" and "bad" channels is explained below with respect to FIGS. 5A–5C. If data cannot be found in the look-up table (step S12), the controller 40 provides a signal to illuminate light 28 (step S14) to indicate that the bell tester cannot evaluate the data. Similarly, when the grades of the different channels are inconsistent, that is, if the grade of one channel is different from the grade determined by another channel (step S13), the controller 40 also provides a signal to illuminate light 28. When at least two channels indicate consistent data, that is, if the "good" channels have the same grade, the controller 40 outputs the grade of the bell tested to the output means 44 by illuminating the appropriate one of lights 26A–26G in accordance with Table 1.

Figure 5A:
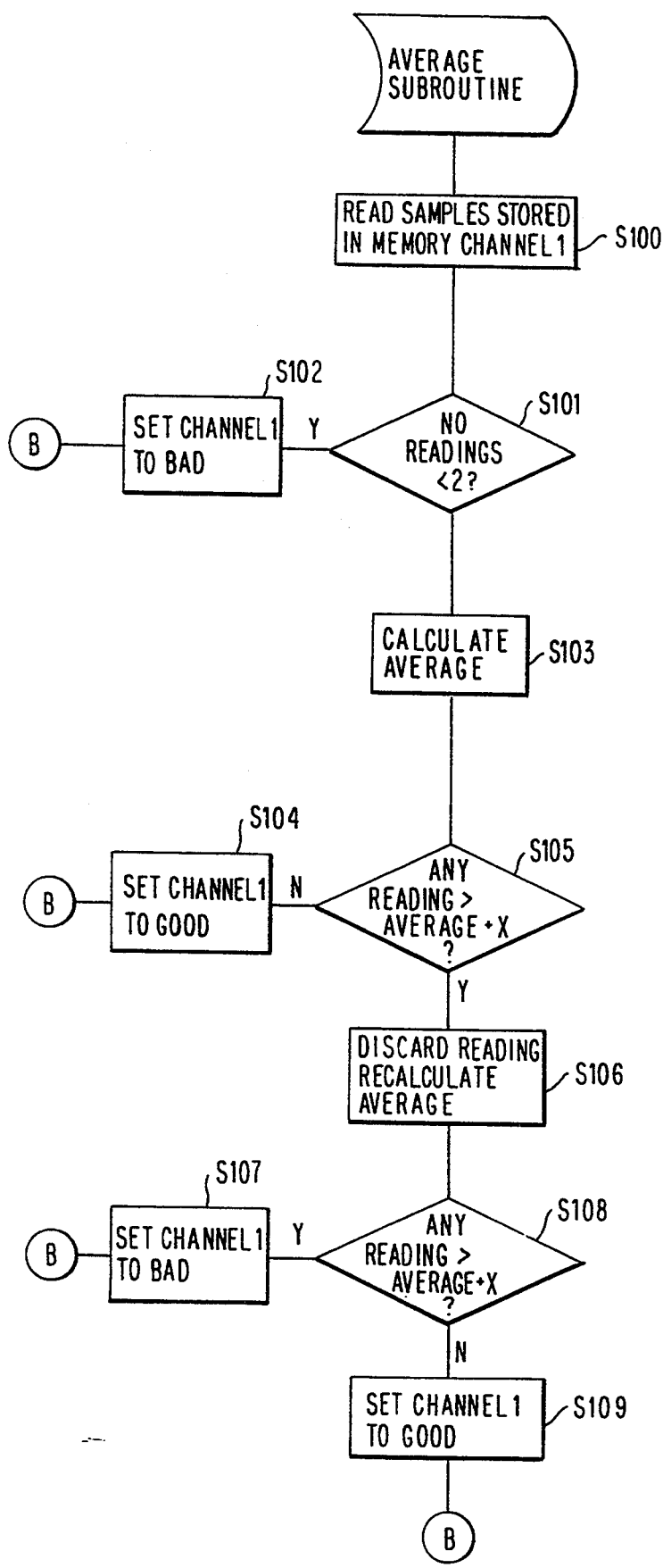
FIGS. 5A–5C are flow charts of the average subroutine for a microprocessor incorporated in the circuit of FIG. 4.
Figure 5B:
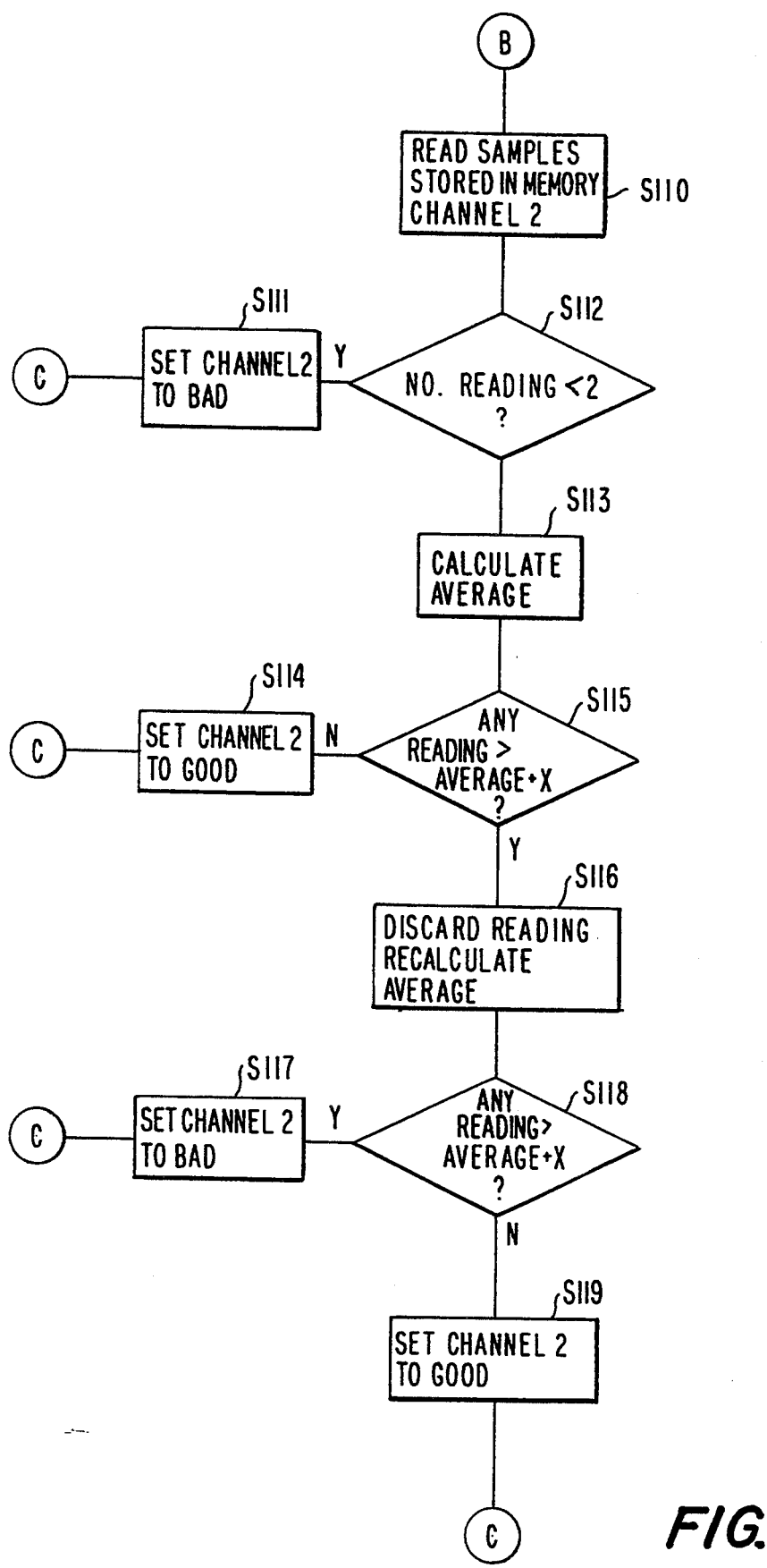
Figure 5C:
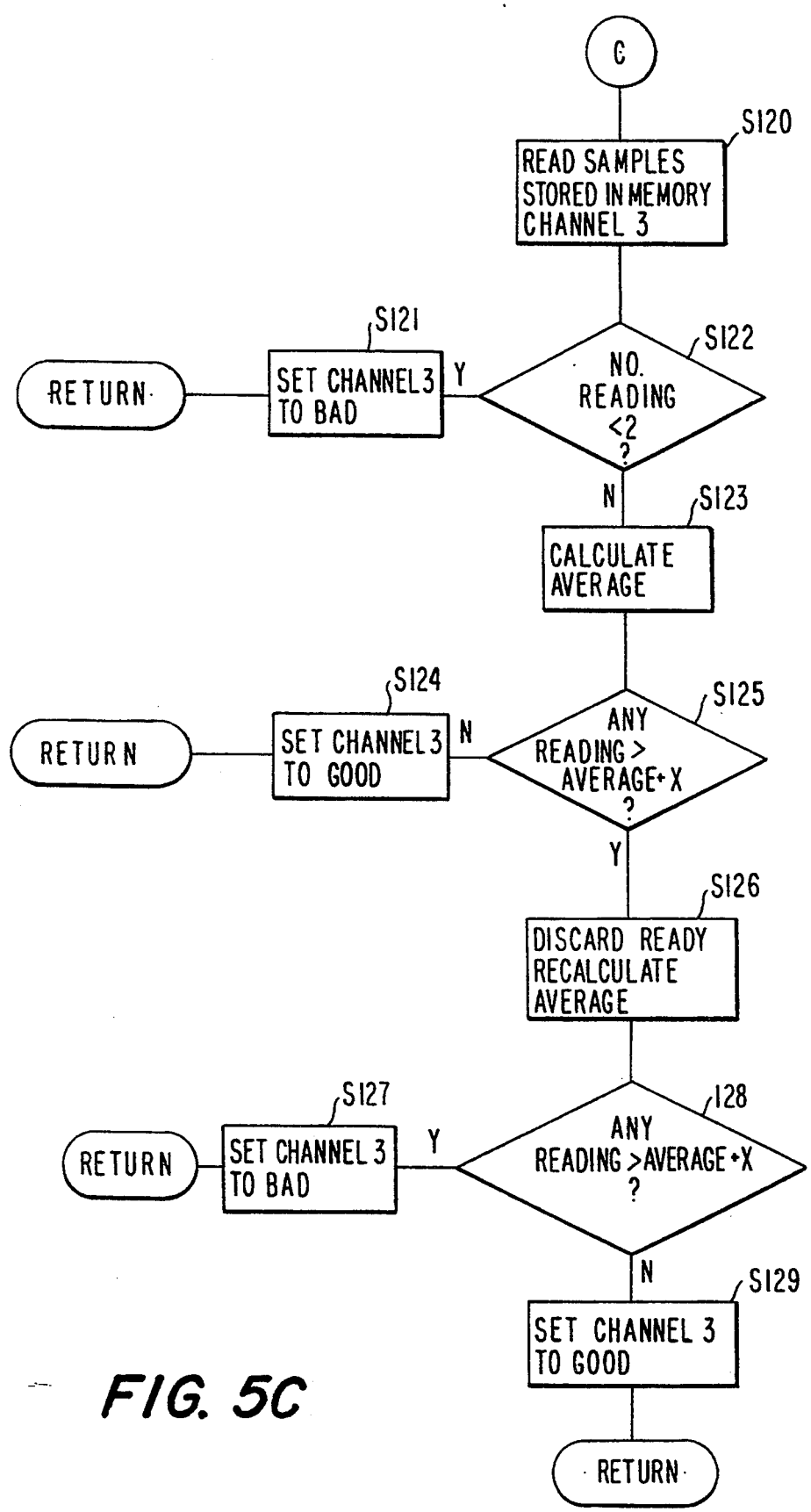

The determination of the average for each channel by the average subroutine and the determination whether a channel is either "good" or "bad", as performed by controller 40, is shown in the flow charts FIGS. 5A–5C. First, the controller 40 reads up to eight samples of channel 1 as stored in its internal memory (step S100). If there are less than two samples (step 101), channel 1 is set to "bad" (step 102) and the procedure proceeds to averaging the second channel.

If there are more than two samples, an average of channel 1 is calculated (step 103). The look-up table in controller 40 also contains a predetermined amount of deviation permitted by an individual sample from the calculated average of all the samples for each type of bell. If any individual sample deviates from the average of all the samples by more than the predetermined amount, in accordance with the look-up table corresponding to the bell type selected, (step S105) that individual sample is discarded, and the average of the remaining samples is recalculated without that individual sample (step S106). Otherwise, the first channel is determined to be "good" (step S104). If, however, upon recalculation any other individual reading deviates from the average of the remaining samples by more than that predetermined amount (step S108) channel 1 is set to "bad" (step S107). Otherwise, channel 1 is set to "good" (step S109).

The same algorithm is performed for channels 2 and 3 as shown in FIGS. 5B, 5C, respectively, to determine (1) if each channel is "good" or "bad" and (2) its respective average. Since the algorithms are the same for channels 2 and 3 as for channel 1, FIGS. 5B and 5C will not be further discussed.

Figure 6A:
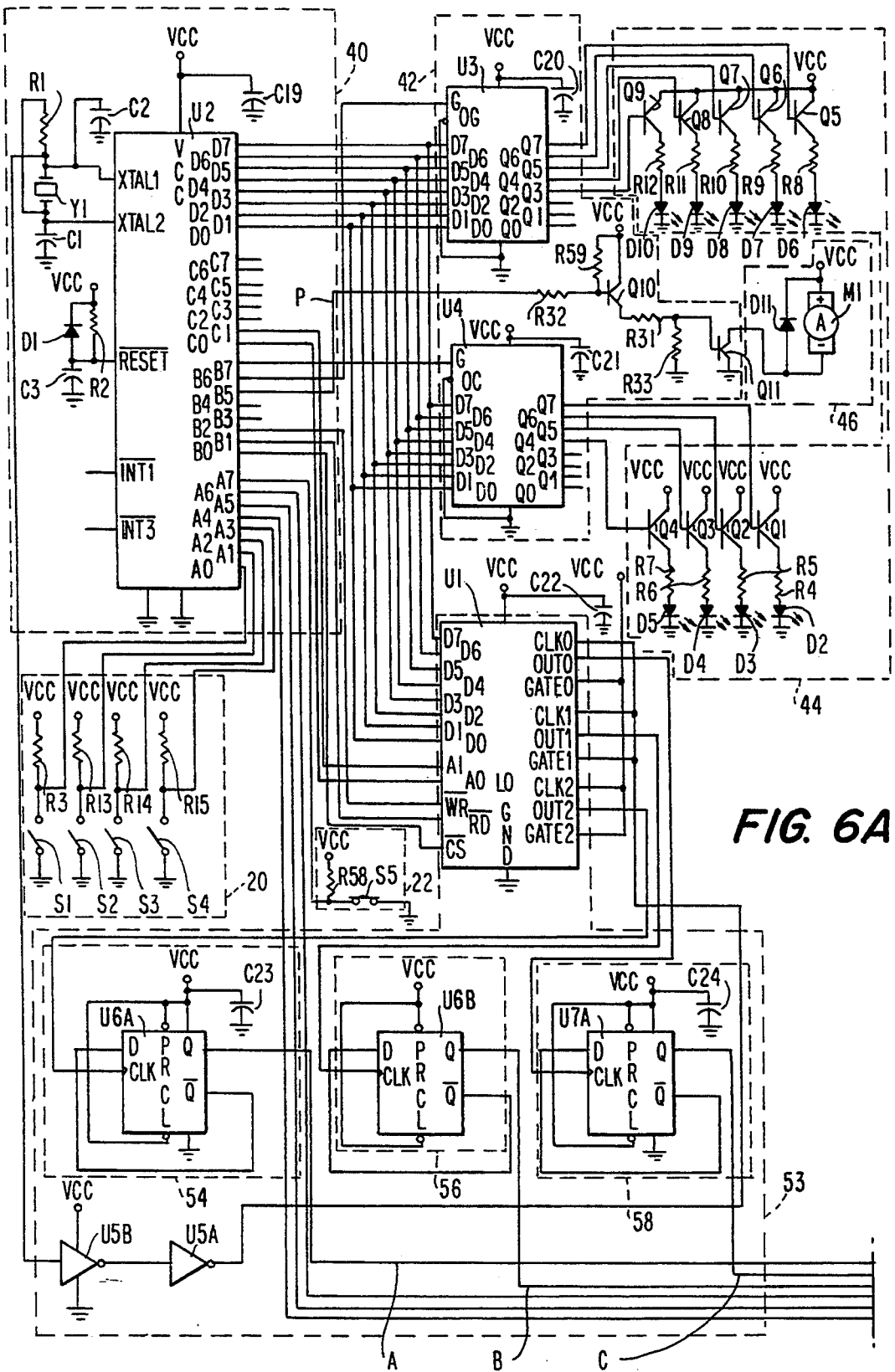
FIGS. 6A and 6B are circuit diagrams for the bell tester of FIG. 1.
Figure 6B:
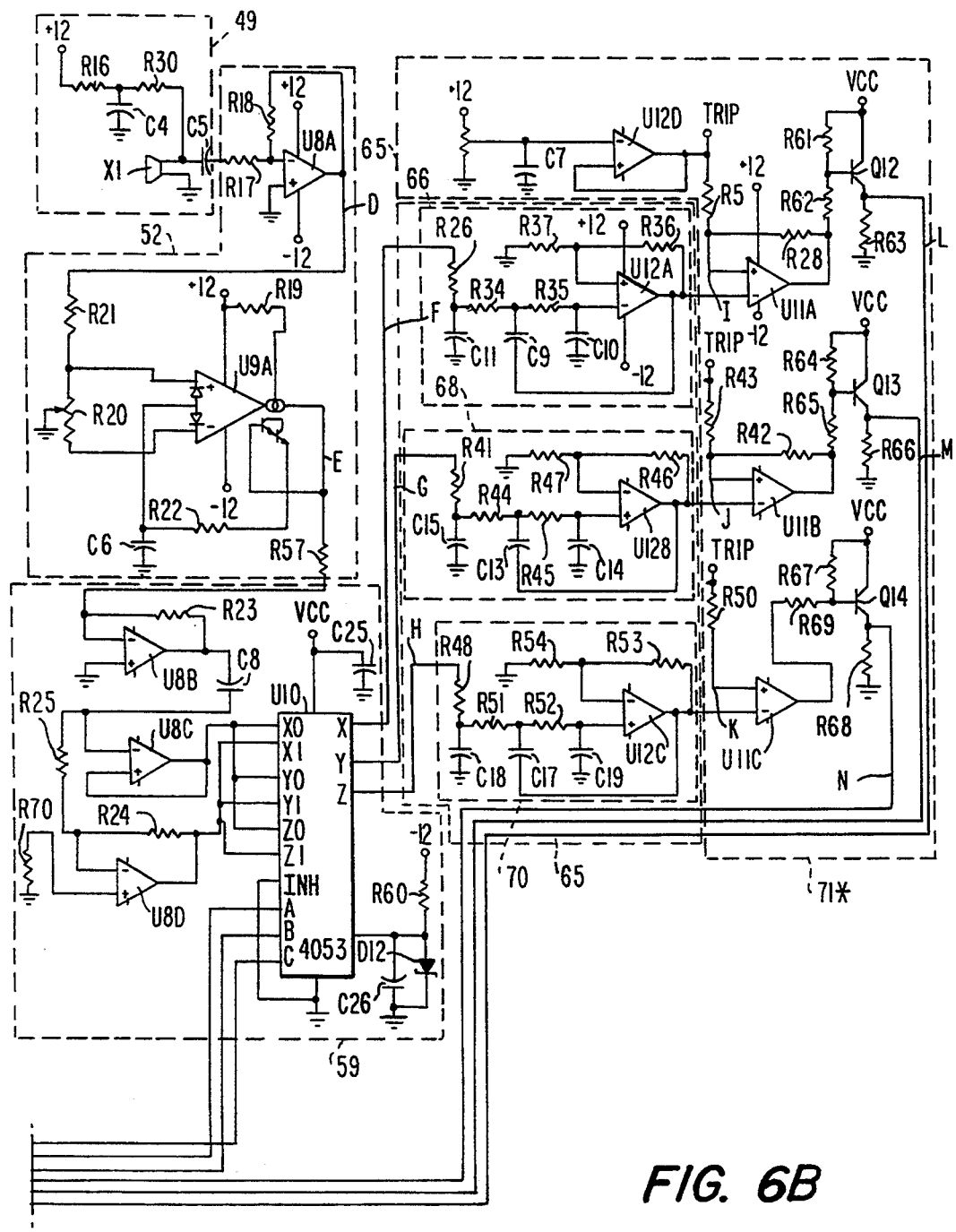

FIGS. 6A and 6B illustrate a preferred circuit diagram for the bell tester 10, although persons skilled in the art who have read this description will recognize that other circuit designs are possible. In FIGS. 6A and 6B, dotted lines delineate the circuit blocks, e.g., controller 40, AGC 78, etc., diagrammatically illustrated in FIG. 3. However, it should be recognized that the delineation is somewhat arbitrary and that certain circuit components could as readily be considered part of one subcircuit as another. For example, transistor Q11 in interface circuit 42 could as readily be considered part of striker circuit 46. A parts list for the circuit in FIG. 4 appears below.

| PARTS LIST | | | | | |
|---|---|---|---|---|---|
| M1 | Motor | | | | |
| Y1 | 5 MHz Crystal | | | | |
| R1 | 1M | R25 | 10K | R49 | 1.6M |
| R2 | 22K | R26 | 10K | R50 | 100K |
| R3 | 10K | R28 | 1.6M | R51 | 110K |
| R4 | 100 | R29 | 100K | R52 | 110K |
| R5 | 100 | R30 | 10K | R53 | 75K |
| R6 | 100 | R31 | 47K | R54 | 47K |
| R7 | 100 | R32 | 3.3K | R57 | 100K |
| R8 | 100 | R33 | 1K | R58 | 10K |
| R9 | 100 | R34 | 110K | R59 | 10K |
| R10 | 100 | R35 | 110K | R60 | 680 |
| R11 | 100 | R36 | 75K | R61 | 10K |
| R12 | 100 | R37 | 47K | R62 | 10K |
| R13 | 10K | R40 | 100K Pot | R63 | 10K |
| R14 | 10K | R41 | 10K | R64 | 10K |
| R15 | 10K | R42 | 1.6M | R65 | 10K |
| R16 | 1K | R43 | 100K | R66 | 10K |
| R17 | 10K | R44 | 110K | R67 | 10K |
| R18 | 680K | R45 | 110K | R68 | 10K |
| R19 | 27K | R46 | 75K | R69 | 10K |
| R20 | 25K Pot | R47 | 47K | R70 | 10K |
| R21 | 270K | R48 | 10K | U1 | 8253 |
| R22 | 47K | D1 | 1N4148 | U2 | TMS7000-40 |
| R23 | 100K | D2 | Red LED | U3 | 74HC373 |
| R24 | 10K | D3 | Red LED | U4 | 74HC373 |
| C1 | 64 pf | D4 | Red LED | U5A, U5B | 74HC04 |
| C2 | 47 pf | D5 | Red LED | U6A, U6B | 74HC74 |
| C3 | 4.7 µf | D6 | Green LED | U7A | 74HC74 |
| C4 | 100 µf | D7 | Green LED | U8A, U8B, U8C | LM324 |
| C5 | 100 nf | D8 | Green LED | U9A | LM13600 |
| C6 | 10 µf | D9 | Green LED | U10 | 4053 |
| C7 | 10 µf | D10 | Green LED | U11A, U11B, U11C | LM339 |
| C8 | 100 nf | D11 | 1N4001 | U12A, U12B, U12C, U120 | LM324 |
| C9 | 15 nf | D12 | 5.1 V Zener | | |
| C10 | 15 nf | Q1 | MPSA06 | | |
| C11 | 360 nf | Q2 | MPSA06 | | |
| C13 | 15 nf | Q3 | MPSA06 | | |
| C14 | 15 nf | Q4 | MPSA06 | | |
| C15 | 360 nf | Q5 | MPSA06 | | |
| C16 | 15 nf | Q6 | MPSA06 | | |
| C17 | 15 nf | Q7 | MPSA06 | | |
| C18 | 360 nf | Q8 | MPSA06 | | |
| C19 | 100 nf | Q9 | MPSA06 | | |
| C20 | 100 nf | Q10 | MPSA56 | | |
| C21 | 100 nf | Q11 | 2N6715 | | |
| C22 | 100 nf | Q12 | MPSA56 | | |
| C23 | 100 nf | Q13 | MPSA56 | | |
| C24 | 100 nf | Q14 | MPSA56 | | |
| C25 | 100 nf | | | | |
| C26 | 100 nf | | | | |

As shown in FIGS. 6A and 6B, the controller circuit 40 comprises a microprocessor U2, such as TMS 7000-40. Resistor R1, capacitors C1 and C2, and crystal Y1 generate a clock reference signal for the microprocessor U2. The controller 40 is also provided with capacitors C3 and C19, resistor R2, and diode D1. The operation of the control algorithms of the microprocessor 40 have been discussed with reference to FIGS. 4A, 4B and 5A–C above.

Bell select switch 20, which is provided for selecting the type or note of a bell, comprises four single-pole, single-throw switches S1–S4 and four resistors R3, R13–R15 as inputs to controller 40. A start circuit 22, comprising momentary contact switch S5 and resistor R58, initiates the testing sequence of the bell by the bell tester.

Interface circuit 42 generates the proper signal levels to the output means 44 and the striker circuit 46 in response to signals from microprocessor U2. The interface circuit 42 comprises two decoding integrated circuits U3, U4 comprising, for example, 74HC373 decoders, for selecting the appropriate output device in response to signals from microprocessor U2. Transistors Q11, Q10 and resistors R32, R59, R31, R33 are provided for applying the appropriate signal level to initiate the striker circuit 46 to strike the bell 12. The striker circuit 46 comprises diode D11 and a motor M1, which is connected to the output of transistor Q11 of the interface circuit 42. The output means 44 comprises nine light-emitting diodes, D2–D10, and associated resistors R4–R12 and transistors Q1–Q9. Light-emitting diodes D4–D10 correspond to lights 26A–26G and light-emitting diodes D2 and D3 correspond to lights 30 and 28, respectively. Light-emitting diodes D2–D5 are connected to the outputs of the decoder U4, and light-emitting diodes D6–D10 are connected to the outputs of the decoder U3.

Controller 40 provides the frequency set points to local oscillator circuit 53, by retrieving those points from a look-up table in accordance with the type of bell selected by bell select switch 20. More specifically, microprocessor 40 provides the three frequencies to clock controller U1. Clock controller U1 provides the three frequencies, respectively, to oscillators U6A, U6B, U7A. The frequencies of the local oscillators U6A, U6B, U7A are set to, for example, the nominal frequency of the selected bell less 5%, the nominal frequency of the selected bell, and the nominal frequency of the selected bell plus 5%, respectively. Oscillators U6A, U6B, U7A are, by way of example, conventional flip-flop circuits. Local oscillator circuit 53 also comprises inverters U5A and U5E to provide a clock signal to the clock controller U1.

The input circuit 49 inputs the audible sound emitted by the tested bell after it is struck by striker 24 and converts the audible signal to an electrical signal for processing. The input circuit 49 comprises a conventional microphone X1, resistors R16, R30 and capacitors C4, C5. The output of the microphone is provided as an input to automatic gain control circuit (AGC) 52 to provide an output with substantially constant maximum and minimum amplitudes. The automatic gain control circuit 52 comprises operational amplifier U8A, differential amplifier U9A, resistors R17, R18, R19, R21, R20, R21, R22, R57, and capacitor C6. The output of AGC circuit 52 is inverted by operational amplifiers U8C and U8D and is mixed with the outputs of the local oscillators 53 by the mixer circuit 59. The mixer circuit 59 comprises operational amplifiers U8B–U8D, resistors R23, R25, R70, R24, R60, capacitors C8, C25, C26, zener diode D12, and mixing integrated circuit U10. That is, each of the outputs of local oscillators 54, 56, 58 is individually mixed with the inverted output of the AGC circuit 52 by mixing circuit U10 to provide three outputs at the output terminals X, Y, Z of U10.

The outputs from U10 are provided to low-pass filter means 65, comprising three low-pass filters 66, 68, 70, respectively. Low-pass filter 66 comprises operational amplifier 12A, resistors R26, R34–R37, and capacitors C9–C11. Similarly, low-pass filter 68 comprises operational amplifier U12B, resistors R41, R44–R47, capacitors C13–C15; and low-pass filter 70 comprises operational amplifier U12C, resistors R48, R51–R54, and capacitors C16–C18. The outputs of low-pass filters 66, 68, 70 are processed by a comparator circuit 71 comprising comparators 72, 74, 76, respectively. That is, when the signal from a comparator is below a threshold voltage of, by way of example 0.22 volts, the comparator provides a zero output. When the signal is above the threshold voltage, the comparator provides an "ON" signal having a constant output of, for example, +5 volts. The length of the "ON" signal is proportional to the period (the inverse of the frequency) of the bell. The comparator circuit 71 also comprises a voltage regulating circuit comprising operational amplifier U12D, capacitor C7, and resistor R40 to generate a regulated 0.22 volts. Comparator 72 comprises operational amplifier U11A, resistors R28, R29, R61–R63 and transistor Q12. Similarly, comparator 74 comprises operational amplifier U11B, resistors R42, R43, R64–R66, and transistor Q13; and comparator 76 comprises operational amplifier U11C, resistors R49, R50, R67–R69, and transistor Q14. The outputs or channels of the three comparators 72, 74, 76 are provided as inputs to microprocessor U2 for evaluation. The microprocessor U2 calculates the frequency deviation of each signal for each of the three channels for grading. The grade of the bell is then output to one of LEDS D1–D10, which correspond to lights 26A–26G, in accordance with Table 1, thereby completing the circuit operation.

Thus, while we have shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only by the scope of the claims appended hereto.

What is claimed is:

1. An apparatus for grading the tonal characteristics of an object having a fixed tone with respect to a nominal tone, comprising:

automatically actuated means for causing the object having the fixed tone to generate an audio signal;

input means for inputting the audio signal;

reference signal generating means for generating a plurality of reference signals having a predetermined frequency relationship with the nominal tone;

mixing means for mixing the audio signal input by said input means with each of the plurality of reference signals; and evaluating means for evaluating the accuracy of the audio signal with respect to the nominal tone in accordance with the audio signal mixed by said mixing means and assigning the fixed tone of the object a grade, wherein the plurality of reference signals comprise a first signal having a first frequency substantially equal to the frequency of the nominal tone, a second signal having a second frequency greater than the first frequency by a predetermined amount, and a third signal having a third frequency less than the first frequency by the predetermined amount.

2. The apparatus of claim 1 further comprising an output means for outputting the accuracy of the input signal as evaluated by said evaluating means, wherein said output means comprises:

a first light source for indicating that the input signal is lower than the nominal tone;

a second light source for indicating that the input signal is substantially that of the nominal tone; and a third light source for indicating that the input signal is greater than the nominal tone.

3. An apparatus according to claim 1, further comprising a selection means for selecting the nominal tone in accordance with the object.

4. An apparatus according to claim 1, further comprising an output means for outputting the accuracy of the audio signal as evaluated by said evaluating means according to the grade of the fixed tone of the object, wherein the tone is graded as having a grade selected from a first grade substantially equal to the frequency of the nominal tone, a second grade greater than the frequency of the nominal tone and a third grade less than the frequency of the nominal tone.

5. An apparatus according to claim 4, wherein said output means comprises:

a first light source for indicating that the audio signal is between 2.5%–5% lower than the nominal tone;

a second light source for indicating that the audio signal is between 1.5%–2.5% lower than the nominal tone;

a third light source for indicating that the audio signal is between 0.5%–1.5% lower than the nominal tone;

a fourth light source for indicating that the audio signal is between 0.5% lower than and 0.5% higher than, the nominal tone;

a fifth light source for indicating that the audio signal is between 0.5%–1.5% higher than the nominal tone;

a sixth light source for indicating that the audio signal is between 1.5%–2.5% higher than the nominal tone;

a seventh light source for indicating that the audio signal is between 2.5%–5.0% higher than the nominal tone;

an eighth light source for indicating that the evaluating means had insufficient information to evaluate the audio signal; and a ninth light source for indicating that the audio signal is 5% lower than, or 5% higher than, the nominal tone.

6. An apparatus according to claim 1, wherein the said evaluating means comprises a microprocessor.

7. An apparatus for grading the fixed tonal characteristics with respect to a nominal tone of an input signal, comprising:

input means for inputting the input signal;

reference signal generating means for substantially simultaneously generating a plurality of reference signals having a predetermined frequency relationship with the nominal tone signal;

mixing means for mixing the input signal with each of the plurality of reference signals;

evaluating means for evaluating the accuracy of the input signal with respect to the nominal tone in accordance with the audio signal mixed by said mixing means and assigning a grade to the input signal, wherein the plurality of reference signals comprise a first signal having a first frequency substantially equal to the frequency of the nominal tone, a second signal having a second frequency greater than the first frequency by less than a semitone and a third signal having a third frequency less than the first frequency by less than a semitone.

8. The apparatus of claim 7 further comprising an output means for outputting the accuracy of the input signal as evaluated by said evaluating means, wherein said output means comprises:

a first light source for indicating that the input signal is lower than the nominal tone;

a second light source for indicating that the input signal is substantially that of the nominal tone; and a third light source for indicating that the input signal is greater than the nominal tone.

9. An apparatus according to claim 7, further comprising a selection means for selecting the nominal tone in accordance with the input signal.

10. An apparatus according to claim 7, further comprising an output means for outputting the accuracy of the input signal as evaluated by said evaluating means according to the grade of the fixed tone of the object, wherein the tone is graded as having a grade selected from a first grade substantially equal to the frequency of the nominal tone, a second grade greater than the frequency of the nominal tone and a third grade less than the frequency of the nominal tone.

11. An apparatus according to claim 7, wherein said evaluating means comprises a microprocessor.

12. An apparatus for grading the tonal characteristics with respect to a nominal tone of an input signal, comprising:

input means for inputting the input signal;

reference signal generating means for generating a plurality of reference signals having a predetermined frequency relationship with the nominal tone signal;

mixing means for mixing the input signal with each of the plurality of reference signals;

evaluating means for evaluating the accuracy of the input signal with respect to the nominal tone in accordance with the audio signal mixed by said mixing means and assigning a grade to the input signal, and an output means for outputting the accuracy of the input signal as evaluated by said evaluating means, wherein said output means comprises:

a first light source for indicating that the input signal is between 2.5%–5% lower than the nominal tone;

a second light source for indicating that the input signal is between 1.5%–2.5% lower than the nominal tone;

a third light source for indicating that the input signal is between 0.5%–1.5% lower than the nominal tone;

a fourth light source for indicating that the input signal is between 0.5% lower than and 0.5% higher than, the nominal tone;

a fifth light source for indicating that the input signal is between 0.5%–1.5% higher than the nominal tone;

a sixth light source for indicating that the input signal is between 1.5%–2.5% higher than the nominal tone;

a seventh light source for indicating that the input signal is between 2.5%–5.0% higher than the nominal tone;

an eighth light source for indicating that the evaluating means has insufficient means to evaluate the input signal; and a ninth light source for indicating that the input signal is 5% lower than, or 5% higher than, the nominal tone.

13. An apparatus for evaluating the tonal characteristics of a musical bell having a fixed tone with respect to a nominal tone, comprising:

first automatic means for causing the musical bell having the fixed tone to generate an audio signal;

input means for inputting the audio signal;

reference signal generating means for generating a first reference signal having a first frequency having a frequency relationship with the nominal tone, a second reference signal having a second frequency greater than the first frequency, and a third reference signal having a third frequency less than the first frequency;

mixing means for mixing the audio signal input by said input means with the first, second, and third reference signals and for providing first, second, and third output signals;

evaluating means for evaluating the accuracy of the audio signal with respect to the nominal tone in accordance with the first, second, and third output signals from said mixing means and assigning the fixed tone of the object a grade; and output means for outputting the evaluation of the accuracy from said evaluating means according to the grade of the fixed tone of the object, wherein the tone is graded as having a grade selected from a first grade substantially equal to the frequency of the nominal tone, a second grade greater than the frequency of the nominal tone and a third grade less than the frequency of the nominal tone.

14. An apparatus according to claim 13, wherein said first means comprises a striker.

15. An apparatus according to claim 13, wherein said input means comprise a microphone and an automatic gain control circuit.

16. An apparatus according to claim 15, wherein said evaluating means comprises:

low-pass filtering means for low-pass filtering the first, second and third output signals from said mixing means;

comparator means for comparing each of first, second and third output signals filtered by the low-pass filtering means with a predetermined value; and controller means for evaluating the accuracy of the first, second and third output signals compared by said comparator means.

17. An apparatus according to claim 13, further comprising a selection means for selecting the nominal tone in accordance with the musical bell.

18. An apparatus according to claim 13, said evaluating means comprising a microprocessor.

19. An apparatus according to claim 14, wherein said evaluating means further comprises a memory wherein said microprocessor samples and stores in said memory the first, second, and third output signals from said mixing means to determine the time periods thereof.

20. An apparatus according to claim 19, wherein if said microprocessor samples and stores less than two samples of at least two of the first, second, and third output signals, said output means provides an output that the evaluating means cannot read the audio signal.

21. An apparatus according to claim 20, wherein said evaluating means comprises a look-up table for storing a plurality of reference values corresponding to the first, second, and third reference signals, wherein, if said microprocessor samples and stores more than two samples of at least two of the first, second, and third output signals, said microprocessor calculates a first average time period for the stored samples corresponding to the first output signal, a second average time period for the stored samples corresponding to the second output, and a third average time period for the stored samples corresponding to the third output, and wherein said microprocessor compares said first, second, and third averages with said plurality of reference values to determine a grade for the audio signal.

22. An apparatus according to claim 21, wherein said output means comprises:

first indicating means for indicating that the audio signal is graded by said microprocessor to be between 2.5%–5% lower than the nominal tone;

second indicating means for indicating that the audio signal is graded by said microprocessor to be between 1.5%–2.5% lower than the nominal tone;

third indicating means for indicating that the audio signal is graded by said means to be between 0.5%–1.5% lower than the nominal tone;

fourth indicating means for indicating that the audio signal is graded by said microprocessor to be between 0.5% lower than and 0.5% higher than the nominal tone;

fifth indicating means for indicating that the audio signal is graded by said microprocessor to be between 0.5%–1.5% higher than the nominal tone;

sixth indicating means for indicating that the audio signal is graded by said microprocessor to be between 1.5%–2.5% higher than the nominal tone;

seventh indicating means for indicating that the audio signal is graded by said microprocessor to be between 2.5%–5.0% higher than the nominal tone; and eighth indicating means for indicating that the microprocessor had insufficient information to grade the audio signal.

23. The apparatus of claim 13 further comprising an output means for outputting the accuracy of the input signal as evaluated by said evaluating means, wherein said output means comprises:

a first light source for indicating that the input signal is lower than the nominal tone;

a second light source tier indicating that the input signal is substantially that of the nominal tone; and a third light source for indicating that the input signal is greater than the nominal tone.

24. A method of manufacturing a sound emitting apparatus comprising at least a first tone generating element and a second tone generating element, comprising the steps of:

providing a plurality of first tone generating elements each capable of generating substantially a first fixed nominal tone;

providing a plurality of second tone generating elements each capable of generating substantially a second fixed nominal tone;

grading each of the plurality of first tone generating elements in accordance with a deviation from the first nominal tone into at least one of a first grade of the first nominal tone and a second grade of the first nominal tone;

grading each of the plurality of second tone generating elements in accordance with a deviation from the second nominal tone into at least one of a first grade of the second nominal tone and a second grade of the second nominal tone; and assembling the sound emitting apparatus by selecting one of (1) the first tone generating element having the first grade of the first nominal tone and the second tone generating element having the first grade of the second nominal tone and (2) the first tone generating element having the second grade of the first nominal tone and the second tone generating element having the second grade of the second nominal tone.

25. A method according to claim 24, wherein said step for grading each of the plurality of first tone emitting elements comprises the steps of:

exciting each of the first tone generating elements to generate a respective audio signal;

generating a plurality of reference signals in accordance with the first nominal tone;

mixing the respective audio signal generated by the one of the first tone generating elements with each of the plurality of reference signals to tom a plurality of mixed audio signals; and determining a grade in accordance with the mixed audio signals mixed in said mixing step with one of a plurality of predetermined values which are indicative of the accuracy of the audio signal with respect to the nominal tone, wherein the plurality of reference signals comprise a first signal having a first frequency substantially equal to the frequency of the nominal tone, a second signal having a second frequency greater than the first frequency by a predetermined amount, and a third signal having a third frequency less than the first frequency by the predetermined amount.

26. A method according to claim 24, wherein said step for grading each of the plurality of first tone emitting element comprises the step of outputting the grading of the first tone emitting element.

27. A method according to claim 26, wherein said outputting step:

indicating that the first tone generating element is a first predetermined percentage less than the first nominal tone;

indicating that the first tone generating element is within a second predetermined percentage of the first nominal tone; and indicating that the first tone generating element is a third predetermined percentage greater than the first nominal tone.

28. A method according to claim 26, wherein said outputting step:

indicating that the first tone generating element is between 2.5%–5% lower than the first nominal tone;

indicating that the first tone generating element is between 1.5%–2.5% lower than the first nominal tone;

indicating that the first tone generating element is between 0.5%–1.5% lower than the first nominal tone;

indicating that the first tone generating element is between 0.5% lower than and 0.5% higher than the first nominal tone;

indicating that the first tone generating element is between 0.5%–1.5% higher than the first nominal tone;

indicating that the first tone generating element is between 1.5%–2.5% higher than the first nominal tone;

indicating that the first tone generating element is between 2.5%–5.0% higher than the first nominal tone; and indicating that there is insufficient information to grade the first tone generating element.

29. The method of claim 24, comprising providing said respective tone generating elements as respective bells.

30. The method of claim 24, wherein a first sound emitting apparatus is assembled from the first tone generating element having the first grade of the first nominal tone and the second tone generating element having the first grade of the second nominal tone and a second sound emitting apparatus is assembled from the first tone generating element having the second grade of the first nominal tone and the second tone generating element having the second grade of the second nominal tone.

31. A method for grading the tonal characteristics of an object having a fixed tone with respect to a nominal tone, comprising the steps of:

using an automatically controlled apparatus to excite an object to generate an audio signal;

inputting the audio signal generated by the object;

generating a plurality of reference signals having a predetermined frequency relationship with the nominal tone;

mixing the audio signal input in said input step with each of the plurality of reference signals to form a plurality of mixed audio signals; and evaluating the accuracy of the audio signal with respect to the nominal tone in accordance with the plurality of mixed audio signals and assigning the fixed tone of the object a grade wherein the plurality of reference signals comprise a first signal having a first frequency substantially equal to the frequency of the nominal tone, a second signal having a second frequency greater than the first frequency by a predetermined amount, and a third signal having a third frequency less than the first frequency by the predetermined amount.

32. The method of claim 31, further comprising sorting the object according to its respective grade.

33. The method of claim 31, further comprising:

outputting the accuracy of the audio signal by indicating at a first light source where the signal is lower than the nominal tone, indicating at a second light source where the audio signal is substantially that of the nominal tone and indicating at a third light source where the audio signal is greater than the nominal tone.

* * * * *